(No Model.)

H. C. BEHR.
DYNAMOMETER.

No. 498,837. Patented June 6, 1893.

Witnesses:
E. A. Brandau
Wilson D. Bentj

Inventor:
Hans C. Behr
By his Atty
John Richards

UNITED STATES PATENT OFFICE.

HANS C. BEHR, OF SAN FRANCISCO, CALIFORNIA.

DYNAMOMETER.

SPECIFICATION forming part of Letters Patent No. 498,837, dated June 6, 1893.

Application filed November 24, 1891. Renewed March 20, 1893. Serial No. 466,950. (No model.)

*To all whom it may concern:*

Be it known that I, HANS C. BEHR, a citizen of the United States, residing in the city and county of San Francisco, State of California, have invented certain new and useful improvements in dynamometers for measuring the units of work performed by or passing through a machine; and I hereby declare the following specification and the drawings forming a part of the same to be a full, true, and exact description of my invention.

My present invention relates to an improvement in dynamometers or devices of the class shown and described in my application for Letters-Patent for improvements in dynamometers filed June 12, 1890, Serial No. 355,212, and allowed July 7, 1891.

The object of the invention is to provide an instrument to measure and register the amount of work done by a machine or passing through a machine in such a manner as to give the result so that it may be readily and easily observed, and the invention consists essentially in the construction, arrangement and combination of parts substantially as will be hereinafter described and claimed.

Figure 1:
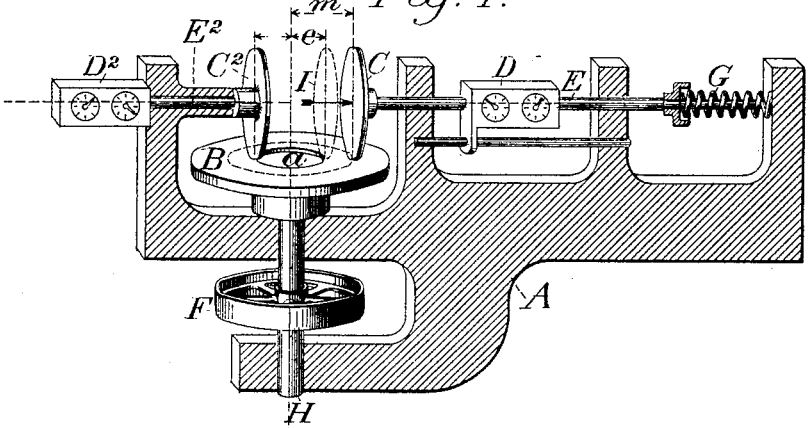
Figure 2:
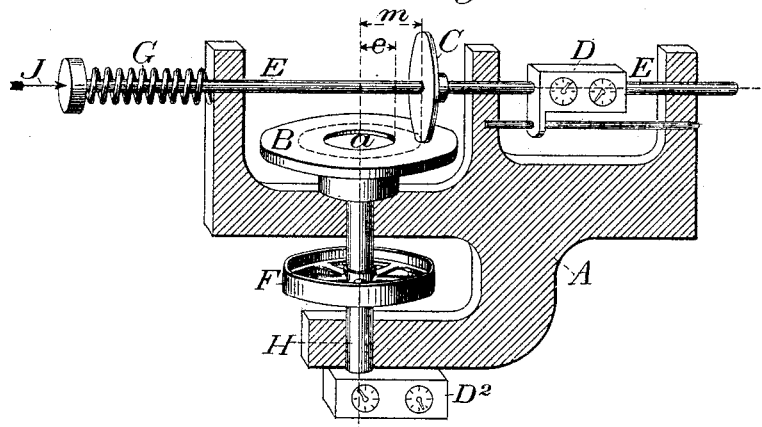
Figure 3:
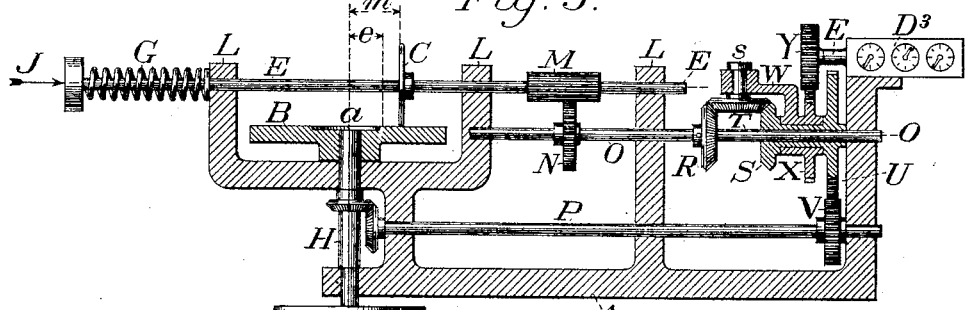

Referring to the drawings:—Figures 1 and 2 are to illustrate the nature of my invention, and the manner of registering variations of speed and power, and the product of these, as set forth in the Letters Patent above referred to. Fig. 3 shows an operative instrument embodying the several features of my present invention.

Similar letters of reference are employed to designate corresponding parts in the different figures.

Referring to the several figures, in each case, A A A are supporting frames, to receive the various operating parts.

B B B are rotating frictional plates, or disks, connected with and driven by the motive power.

C C C and $C^2$ are friction disks, bearing upon, and receiving motion from the driving disks B B B.

D D $D^2$ $D^2$ and $D^3$ are counters, indicating in proportion to the relative amount of rotation of the spindles E and $E^2$ in Fig. 1, and E and H in Fig. 2, and in proportion to the difference in speed of the various shafts to which they are connected.

F F F are driving pulleys, transmitting motion from the machine to which the instrument is applied.

G G G are springs resisting the driving force applied to the machine.

Referring first to Figs. 1 and 2, these represent the principle of measuring and recording the units of work, according to my invention, as set forth in the application for Letters Patent before referred to, and is employed here to more clearly define the difference between that invention and the present one; these methods being corelevant and applicable to different kinds of machinery under the various circumstances of use. In Fig. 1, the friction disk $C^2$ remains at one position on the driving disk B, recording, constantly, the amount of rotation of the pulley F and the shaft H, by means of the counter $D^2$ indicating such rotation. The other friction disk C is movable in the line of its axis, and arranged to traverse across the face of the driving disk B, receiving rotary motion in proportion to the distance $m$, and as the intensity of a force acting in the line of the spindle E, may determine. When the intensity of this force at G ceases the disk C is in the position shown by the dotted diagram I, the movement of the two disks C and $C^2$ coinciding, and the two counters D and $D^2$ indicate uniformly, but any other position of the disk C, causes a difference in the record of these counters, and this difference becomes a measure of the units of work transmitted. The pressure on the end of the spindle E and on the spring G, can be by means of a friction brake, acting thereon, or in any other manner that imparts the acting force thereto, or this or the spring may be placed to receive the strain transmitted by rotating parts, such as coupling pulleys, as shown in my patent or letters hereinbefore referred to, force may be by traction, as in the draft of vehicles, the shaft H being, at the same time, connected and measuring the velocity at which the device acts. Fig. 2 is only a modification of the same apparatus, shown in Fig. 1 the counter D being, in this case, applied directly on the driving shaft H, and the force G changed to the other end of the spindle E. It will be noticed that in both these cases, as well as in Fig. 3, the zero point or position of coincidence on the disk B, is not taken at the center $a$, but at the distance $e$ from the center. The variations or range being from $e$ to $m$, as indicated in the drawings.

Referring next to Fig. 3, which represents my present invention. It will be seen that only one counter is employed in this case, which records and shows the units of work, as a product of force and distance moved. In this instrument I connect these two elements mechanically, and record their variations by a single counter $D^3$. The shaft or spindle E is revolved by the disk C, bearing upon and receiving motion from the disk B, in proportion to any distance $m$. This spindle E is adjusted in the line of its axis in proportion to the propelling force at J, the spring G acting oppositely, as shown in the drawings. This spindle E is free to slide in its bearings L L L, and has upon it a long pinion M, meshing into a spur wheel N, on the shaft O, so these two shafts, E and O, move in definite relation to each other, as the size of the pinion M and wheel N may determine. Parallel to the shaft O, is placed another shaft P, connected by bevel gearing with the shaft H, as shown, so that the motion of this shaft is dependent upon the speed of the machinery connected to, or driving the pulley F. It will thus be seen that the two shafts O and P, and the first movers E and H, have the following relation: In the case of the shafts O and E, in proportion to the force applied, and to the weight or velocity at which this force acts, and in the case of P and H, only to the rate or velocity at which the force acts, the variations between these movements, indicating the units of work performed. The connection between the shafts O and P and the counter $D^3$, is made by means of two bevel wheels R and S, both meshing into a third bevel wheel T. The bevel wheel R is keyed fast on the shaft O, and the bevel wheel S is connected by a sleeve with the spur wheel U, as shown in the section. This spur wheel U meshes into a smaller spur wheel V, on the shaft P, so the bevel wheels R and S revolve in opposite directions, and when the disk C is at the point $e$, at equal velocities, so the intermediate bevel wheel T will stand still in one position, in respect to its axis $s$. If there is any change in the relative velocities of the bevel wheels R and S caused by an increase of force at J, and consequent change of the position of the shaft E and disk C, away from the initial point $e$, then the velocity of the bevel wheel R, being increased in respect to the wheel S, the bracket W and bevel wheel T, will be carried and revolved around the axis of the shaft O accordingly. This bracket W is formed integrally with or attached to the spur wheel X, and this wheel gears into the spur wheel Y, on the spindle of the counter $D^3$, so this counter, by means of the trains of gearing, as described, records in proportion to the difference of velocity between the shafts E and H, consequently, variations in a force acting at J, qualifying this latter by the speed of the shaft H, recording the units of work passing through the instrument.

The mechanism for connecting the shafts O and P to the counter $D^3$, so the difference of their speed will be the recording element, can be accomplished in various ways. The method shown is a common one in practice where such movements are required.

The frictional gearing, consisting of disks B and C, may also be modified in various ways to produce the same result; the form shown is, however, one of the most simple and least expensive.

Having thus described the nature and objects of my invention, what I claim as new, and desire to secure by Letters Patent, is—

1. In a registering dynamometer the combination of the two shafts, or spindles, H and E, so arranged and connected as to revolve at the same or different velocities; the revolutions of one shaft being a measure of the product of force and velocity, and the other of velocity only; a counter $D^3$ connected to both so as to register the difference of their revolutions in the manner substantially and for the purposes described.

2. In a registering dynamometer, the friction disks B and C, arranged to revolve at variable speeds, relatively, and connected to the two shafts H and E; a counter connected therewith by suitable gearing, so as to register the difference of revolution in these shafts, and thus indicate the units of work passing through the instrument, substantially in the manner and for the purposes described.

3. In a registering dynamometer, the shaft E provided with the disk C and the long pinion M, said shaft being capable of movement in the line of its axis, the shaft O having thereon the gear N which engages the pinion M so that variations of force sliding the shaft E endwise, will cause a corresponding change of velocity and transmit the same to the second shaft O, the shaft H, friction disk B thereon with which disk the disk C is arranged in contact, the shaft P geared to the shaft H, the bevel wheels R and S on shaft O, intermediate wheel T between said bevel gears, gearing connecting shafts O and P, the counter $D^3$, having gear wheel Y engaging gear X on the bracket W, substantially as described.

4. In a registering dynamometer, the combination of the two shafts or spindles H and E so arranged and connected as to revolve at the same or different velocities, friction disks B and C arranged to revolve at variable speeds relatively and connected to the shafts H and E, the shafts O and P, said shaft O being geared to shaft E and said shaft P being geared to shaft H, the counter $D^3$ having its spindle provided with a gear wheel engaging gear X on bracket W, the bevel wheels R and S on shaft O revolving in opposite directions, the intermediate bevel-wheel T between said gear wheels, the spur wheel U on the shaft O engaging the smaller spur wheel V on shaft P, all substantially as described.

5. In a registering dynamometer, the combination of the two shafts O and P, in combination with the first shafts E and H, transmitting, respectively, the power and velocity of a force acting through the instrument, and a single counter $D^3$, so connected to the two shafts as to record variations of their relative velocity, and thus indicate the work passing through the instrument, in the manner substantially as shown and described.

In testimony whereof I have hereunto affixed my signature in the presence of two witnesses.

HANS C. BEHR.

Witnesses:
ALFRED A. ENQUIST,
WILSON D. BENT, Jr.